UNITED STATES PATENT OFFICE 2,106,318

FILTERING

Roy D. Elliott and Mary J. Elliott, Jersey City, N. J.

No Drawing. Application October 15, 1932, Serial No. 638,029

9 Claims. (Cl. 210—203)

This invention relates to improvements in filtering; and it comprises an improvement in filtering turbid liquids through pervious granular filter beds of inert materials wherein the granules are provided with a coating or adsorption of an adhesive foreign material having a greater physical affinity for the particles of the turbidity than the affinity of the untreated material; the coating or adsorption, in the case of sand filters and aqueous sugar solutions, being often composed of rosin of colloidal fineness; all as more fully hereinafter set forth and as claimed.

In filtration of turbid liquids through pervious granular beds, the granules are usually silica or a silicate; sand, sandlike pumicestone, asbestos, kieselguhr, etc. These are the cheapest and most generally available materials. Kieselguhr is composed of extremely fine particles but, for the present purposes these may be considered granules. Asbestos rock is sometimes used as granules carrying loose surface fibers; and sometimes fibers are used in loose condition, functioning in a filter in the same way as granules. For the purposes of the present invention, all these materials may be called sand. Unfortunately, silica and the silicates do not have what may be called an attractive power or affinity for the fine solids which form the turbidity in most aqueous liquids; wet sand neither discharges charged colloid particles nor tends to pick up very fine suspended solids. Clean wet sand attracts and holds with great force a thin film of water around it. Thus, in a filter bed composed of clean sand, finely divided solids may pass entirely through the filter bed without contacting the true surface of any granule of the filter bed. After a period of running, the filtering surface of the sand becomes foul, first with larger particles retained by the straining action of the bed and gradually with smaller particles of the filter residue. This deposit then constitutes the true filter medium and the filtrate begins to run bright, but by this time the rate of flow has greatly diminished due to partial clogging of the pores. In our invention the sand grains are given a coating of a material having less power of attracting a film of water than has sand, and thus suspended solids may more easily come into contact with and adhere to the surface of the filter medium. Clean sand filters are most effective with flocculated turbid liquids containing coarse turbidity or sediment which can be mechanically held in the intergranular spaces. They are of little use in clarifying liquids carrying a fine turbidity. There are few turbid liquids from which clean sand grains will absorb colloidally fine matter; liquids in which these matters are of such character as to tend to displace adsorbed water on the surface of the sand grains.

Any sand filter works better after a period of use during which the pores become clogged with sediment to a certain extent; not enough to plug the filter but enough to reduce void dimensions. The sediment is then the real filtering material and the sand is, so to speak useful as a mechanical support. In order to promote this type of plugging or stoppage of the pores, in the case of turbid liquids carrying fine suspended matter, it is usual to employ "filter aids"; generally something of the nature of paper pulp, kieselguhr, etc.

In the present invention, this defect of sand and silicate filters is obviated by providing the granules with a coating or an adsorption of foreign matter having an affinity, on the one hand, for sand and, on the other, for the solid particles constituting the turbidity. Sometimes, this coating or adsorption carries an electrical charge; either positive or negative, and opposite to that of suspended colloid particles. In many cases the coating or adsorption applied is of a material which is somewhat sticky or tacky but in these cases, it is not of such a character or of such an amount to produce any tendency toward bonding the particles together. Many substances are useful in the present invention, among them rosin or other resin, rubber, gum chicle, cellulose nitrates, asphaltum, tar, etc.

For aqueous sugar solutions, it is found that good results can generally be secured with the aid of a little rosin carried by the grains. Rosin or colophony is a material of acid nature, being mainly abietic anhydrid. Ordinary rosin is not particularly sticky or tacky at ordinary temperatures. In filtering sugar solutions, which is generally done at temperatures above 60° C., say, about 80° C., it becomes somewhat more tacky, but it is not used in any amount making the grains sticky as this would interfere with the normal action of a granular pervious bed. A moderate amount of colloidally fine rosin carried by sand grains, gives excellent results in filtering sugar solutions, even where the bulk of the suspended turbidity is of colloidal fineness. This is particularly the case where the sugar solution has been defecated with lime and phosphate; giving precipitates of more or less basic nature.

The foreign material may be supplied to the sand, etc., grains prior to use in filtration; or it may be supplied simultaneously; a certain amount of the foreign matter being added to the first portion of the turbid liquid going through the filter.

In using rosin, either way is convenient. Rosin size may be diluted with water until it exhibits a faint milkiness and this liquid poured through the filter. The sand will pick up colloidal rosin to an extent sufficient for the present purposes. Or, if the alkalinity of the rosin size is not unobjectionable, a little rosin size may be stirred into the first portion of liquid to be filtered. Rosin size is rosin soap with an excess of rosin and this rosin precipitates on dilution. An alcoholic solution of rosin diluted with water is also a convenient way of producing a coating material for the present purposes.

For general purposes, rosin is the best adsorbing material for use with sand. It is not only adsorbed by sand, but it has adsorbing power for the usual solids of turbid aqueous solutions. But for other purposes, rubber applied in the form of latex is convenient. Commercial latex is ammoniacal and the contained rubber particles are negatively charged. It imparts a distinct tackiness to the sand grains, enabling a mechanical pick-up of solids, and it is easily applied. The same considerations apply to gum chicle. Cellulose nitrate is particularly applicable to certain types of colloid suspensions; because it has considerable adhesive power and possibly also because of differences in electrical charge. In all cases using stationary sand filters, it is the character of the surface at which the liquid enters which controls filtration; and in the present invention, it is sufficient if the surface or a top layer of the filter be treated. This fact enables the extension of the present invention to certain types of granular bed devices not using silicates. The presence of adsorbed matter enhances pick-up of turbidity. Among these other types of filters are the boneblack filters used in decolorizing sugars. A boneblack filter has not only the duty of decolorizing, but, to some extent, a mechanical duty in filtration. In a columnar bone-black filter treating turbid sugar liquors from which it is desirable to remove all haze, it is useful to put a little colloid rosin in the top layer. In a boneblack filter with down filtration, the top layer of boneblack clearly becomes exhausted as regards decolorizing power and it then acts as a mechanical filter, while the underlying boneblack plays its usual part. When the boneblack is regenerated by heat, the rosin disappears.

What we claim is:—

1. In the filtration of turbid liquids through pervious filter beds of loose granular media, the improvement which comprises providing the granules with a light coating or adsorption of an adhesive substance having an affinity both for the material of the granules and for the particles of the turbidity.

2. In the process of claim 1, the improvement which comprises providing said granules with said coating or adsorption prior to filtration.

3. The improvement of claim 1 which comprises providing said granules with said coating or adsorption simultaneously with filtration.

4. The process of claim 1 wherein the granules are of siliceous nature.

5. The process of claim 1 wherein the granules are sand.

6. In filtering turbid liquids, the process which comprises passing such a turbid liquid through a pervious granular bed, the individual granules being coated with an adhesive material but the amount of adhesive being insufficient to admit of substantial mutual adhesion of the granules.

7. In filtering turbid liquids, the process which comprises passing such a turbid liquid through a pervious granular bed, the individual granules carrying a coating of adhesive organic material, the amount of coating and its character being such as to prevent substantial adhesion of the granules to each other.

8. In the process of claim 1, the improvement which comprises providing the granules with a coating of a tacky substance.

9. In the process of claim 1, the improvement which comprises providing said granules with a coating of rosin, the rosin being introduced in and together with the turbid liquid.

ROY D. ELLIOTT.
MARY J. ELLIOTT.